Dec. 5, 1967  E. S. TAMM  3,356,873
DC MOTOR WITH RECTIFIERS MOUNTED IN THE END BELL
Filed Nov. 12, 1965  2 Sheets-Sheet 1
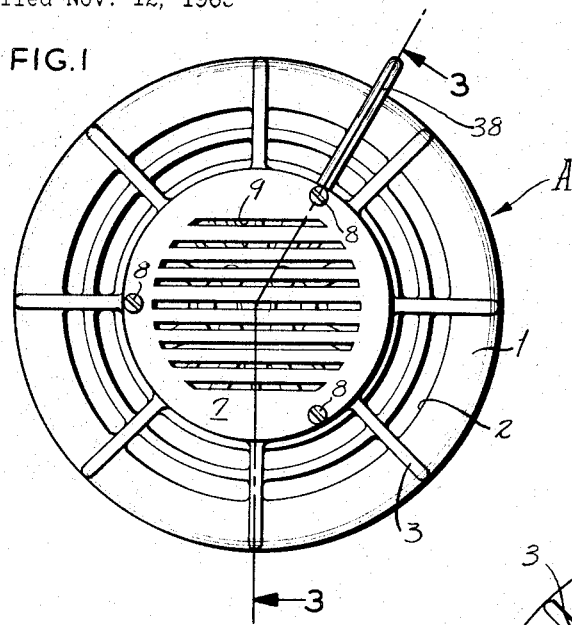
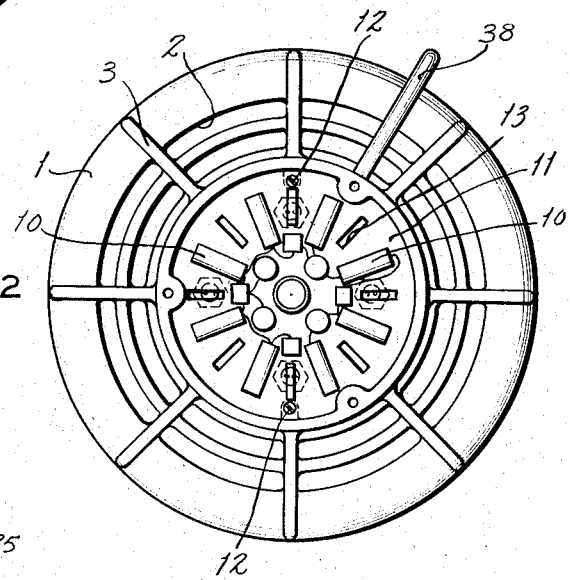
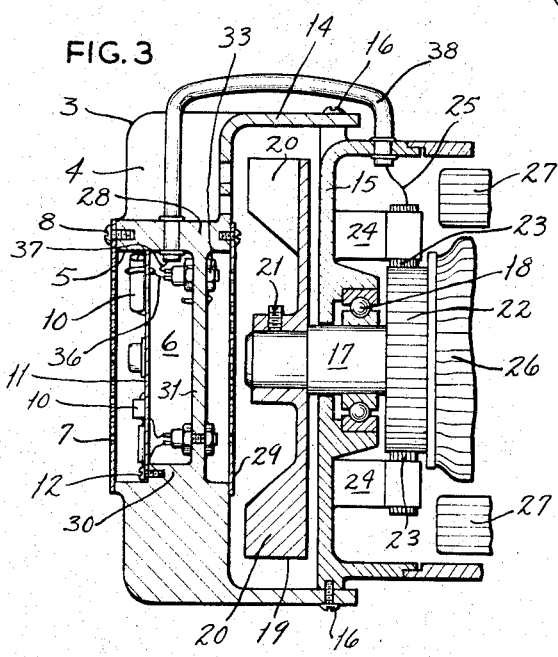
INVENTOR
EMIL S. TAMM
BY
ATTORNEY Dec. 5, 1967 E. S. TAMm 3,356,873
DC MOTOR WITH RECTIFIERS MOUNTED IN THE END BELL
Filed Nov. 12, 1965 2 Sheets-Sheet 2

INVENTOR
EMIL S. TAMM
BY
ATTORNEY

United States Patent Office 3,356,873
Patented Dec. 5, 1967

3,356,873
DC MOTOR WITH RECTIFIERS MOUNTED
IN THE END BELL
Emil S. Tamm, Fort Smith, Ark., assignor to Baldor Electric Company, Fort Smith, Ark., a corporation of Missouri
Filed Nov. 12, 1965, Ser. No. 507,302
8 Claims. (Cl. 310—68)

This invention relates in general to an electrical motor assembly, and more particularly, pertains to a compact arrangement for electrical motor components including means for precluding their overheating as normally occurs during extended usage of a motor.

It is an object of this invention to provide an electrical motor assembly for a direct current type motor which is energized from rectified alternating current, and which further includes means for conveniently securely mounting the various electronic components that are contained within the rectifying unit of the motor in such a manner that said components will be concealed from view and also properly ventilated so as to alleviate their overheating during usage.

It has become the practice in the electrical motor industry to utilize solid state rectifiers such as silicon controlled rectifiers as a convenient method for converting common alternating current into a form of direct current for the purpose of furnishing the necessary energy that is required to sustain a direct current motor in operation. Formerly, it was common to incorporate into the circuitry of motors gas-discharge triodes or thyratron type rectifiers which functioned to effect under the principle of thermionic electron emission to convert line charge to direct current where the available source of electrical power supplied only alternating current. Many inconveniences were present with the use of the thyratron type rectifiers as they necessitated the use of several additional bulky electric components which could not be included internally within the motor structure, but rather, must have been mounted externally of the motor either upon its frame, or in some other remote place. Use of such a motor and rectifying unit was rather restrictive from a convenience standpoint since the entire assembly could not be incorporated uniformly into a unitary motor structure. Also, thyratron type rectifiers normally do not withstand elevated temperatures or excessive heating, and are subject to burn out when exposed to a prolonged operation of the motor. As a result, electrical motor manufactures have resorted to the use of silicon controlled rectifiers for providing the means for converting, where necessary, alternating current for use in supplying electrical charge for operation of a direct current motor. Among the advantages that have been found to be prevalent in the use of this form of rectifying unit is that it can be compacted into a relatively small package for incorporating directly interiorly within the motor frame. Furthermore, such a rectifying unit withstands elevated temperatures without experiencing failure.

A rectifying unit of the silicon controlled type to properly function incorporates many small electronic components that coact to properly convert an electric charge, and such a unit due to its relatively small size generates and is subjected to high temperatures as during its continuous usage with a prolonged operation of the electrical motor. As a result, although it has now been found possible to conveniently incorporate such a unit totally within the motor structure, it is also necessary to provide for its ventilation and furnish means for dissipating its generated heat so as to prevent a destruction of any of its integral electronic components.

It is, therefore, another object of this invention to provide a direct current electrical motor which includes internally within its assembly, hidden from view, an entire rectifying unit which functions to convert the available alternating current into the necessary direct current required for supplying the essential electric charge for sustaining the electrical motor operative.

It is a further object of this invention to provide a direct current electrical motor assembly incorporating an electric charge rectifying unit which is conveniently disposed within the motor structure so as to be continuously exposed to the cooling air currents of the motor's ventilating system during the operation of the motor for assisting in decreasing the elevated temperatures created within and emanating from the rectifying unit as during its functioning.

It is an additional object of this invention to provide a direct current electrical motor assembly which includes interiorly within its construction an electric charge rectifying unit which is firmly mounted to the motor structure, and thereby stabilized and insulated against any damaging shock or jarring that is normally detrimental to the delicate and sensitive electronic components comprising said unit.

It is still another object of this invention to provide a direct current electrical motor having an electric charge rectifying unit which is conveniently compacted and disposed within a protective enclosure located integrally within the electrical motor assembly.

It is yet another object of this invention to provide a direct current electrical motor assembly which incorporates internally within its framework an electric charge rectifying unit which is disposed contiguously to the heat dissipating and stabilizing structural portions of the motor for assisting in transferring the heat generated by continuous usage of said electrical motor and rectifying unit away from said unit thereby enhancing the work life of its integral electronic components.

It is still a further object of this invention to provide a direct current electrical motor assembly which includes totally within its structure an electric charge rectifying unit, which entire assembly is desirably compact in size, uniform in structure, and streamlined in appearance since it is unnecessary to attach any electrical subassemblies such as said rectifying unit to the exterior of the motor structure.

Other objects and advantages of the invention will become apparent to those skilled in the art when reviewing the following detailed description taken in connection with the accompanying drawings, in which:

FIGURE 1 is an end view of the electrical motor revealing its end casing and rectifying unit outer shield;

FIGURE 2 is an end view of the electrical motor revealing its end casing and rectifying unit with the outer shield removed;

FIGURE 3 is a partial sectional view of the electrical motor taken on line 3—3 of FIGURE 1.

Figure 4:
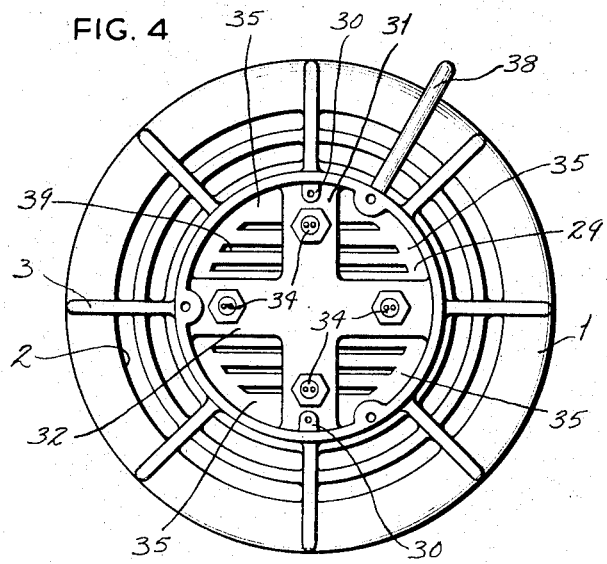
FIGURE 4 is an end view of the electrical motor revealing its end casing with the rectifying unit partially removed.

Referring now by reference characters to the drawings, in FIGURE 1, there is disclosed an end view of an electrical motor A revealing the end cover 1 which is annular in configuration and having a plurality of symmetrical concentrically arranged vent openings 2 which provide an ingress for ambient air for use in assisting in cooling the internal operational structure and components of the electrical motor. Structural reinforcement is provided for the end cover by means of a series of radially disposed fins 3 integrally affixed to said end cover. It should be noted that the fins 3, as more clearly disclosed in FIGURE 3, are firmly affixed to the end cover, but preferably have large externally exposed planar side surfaces 4 which function to assist in dissipating any internal heat into the atmosphere that has been transferred by conduction to the end cover after being created proximate this area of the electrical motor assembly. This end cover 1 is constructed of the same metallic material, normally cast iron, as is commonly used in forming the framework elements of electrical motors, and such a material generally has a characteristic of providing for heat transfer thereby rendering the end cover dual functioning in providing protection for the internal components of the motor, and additionally for acting in the nature of a heat sink or heat storage reservoir for furnishing reasonably rapid conduction of internally created heat out of the motor and into the surrounding air. The end cover has a circular opening or bore 5 provided centrally therethrough, and is so arranged so as to form an enclosure 6 wherein may be located the various electrical components that make up the electric charge rectifying unit of the motor. Providing an external cover for enclosure 6 is an outer shield 7 which may be securely affixed to the end cover by any common fastening means, such as by use of screws 8. Provided through the interior central portion of shield 7 are a plurality of horizontal, parallel slots 9 which function as vents to allow for the passage of conditioning air therethrough for exerting a cooling effect upon the various electrical components comprising the rectifying unit as contained within the enclosure.

The end view of the electrical motor, as revealed in FIGURE 2, discloses the end cover 1, having the outer shield 7 removed therefrom so that the group of electronic components 10 comprising the solid state rectifier unit are exposed as affixed to a circuit board 11. The electronic components 10 of this silicon controlled rectifier unit may be of a variety of electrically connected diodes, resistors, capacitors, or other components, which when charged for functioning have a tendency to become overheated to elevated temperatures, and unless they are properly cooled may selectively deteriorate as by burning out. The electronic components are interwired and mounted upon the circuit board 11, which may be constructed of any non-current conducting, high resistant material, such as a phenolic resin, as is commonly used in the art. This circuit board is rigidly affixed by means of common screws 12 to the end cover of the motor within the enclosure, and assists in transferring any heat emanating from the charged electronic components to said end cover providing for heat dissipation. The circuit board 11 has a series of vent openings 13 which are radially disposed providing for a passage of the cooling air therethrough for further conditioning the interior of the motor structure after said air has been first exposed to the electronic components. Thus it can readily be seen that the electronic components of the rectifier unit are so disposed conveniently proximate the interior of the electrical motor, that not only does the unwanted heat transfer by means of conduction into the end cover of the electrical motor for dissipation, but said components are further exposed to the conditioning air that is commonly drawn internally into the electrical motor by its ventilating system for providing a cooling effect therein.

The positioning of the electric charge rectifying unit of this invention is further revealed in FIGURE 3, as are the other operative parts of this direct current electrical motor. The end cover 1 having its heat dissipating fins 3 integrally attached thereto further contains an integral laterally extending sleeve 14 which may be rigidly affixed to the bearing plate 15 of the electrical motor by means of fastening screws 16. The construction and operation of this electrical motor is quite similar to the normal functioning of any standard direct current motor wherein a motor shaft 17 is disposed for free rotation upon bearings 18 centrally within the aforementioned bearing plate. A common electrical motor fan 19 having fan blades 20 is secured proximate one end of the motor shaft by means of a set screw 21, and is rotated in unison with said motor shaft for providing a means for drawing external air into the interior area of the electrical motor for effecting a cooling therein. Further attached and mounted upon the motor shaft is a commutator 22 which receives direct current, in the form of rectified alternating current from a pair of brushes 23. The aforementioned brushes are held stationary by means of brush carriers 24, with said brushes being charged by the electric charge conveyed through conductor 25. The direct current is conducted through the brushes 23 and to the commutator 22 which transfers the electric current to the armature 26 wherein is energized an electromagnetic field which synchronously acts in conjunction with the electromagnetic fields as developed within the field windings 27 for producing a necessary motor torque providing for sustained and continuous running operation to the electrical motor.

There is disposed centrally within the end cover 1 an enclosure 6 which provides an area for locating the various electronic components of the rectifying unit which must necessarily cooperate for converting ordinary alternating current into a desired direct current for use in energizing the electrical motor. The enclosure 6 is formed by the inner annular surface or bore 5 of the inner sleeve 28 of the end cover, with the outer shield 7 and the inner shield 29 providing side closures for the enclosure. Disposed substantially across the opening of enclosure 6 is the circuit board 11 containing the various electronic components of the rectifier unit. The circuit board is securely affixed by means of screws 12 to the internal protruding ledges 30 integral with the surface 5 of inner sleeve 28. Arranged in parallel relationship with the circuit board 11 within the enclosure are a pair of support arms 31 and 32, see FIGURE 4, which also connect to the surface 5 of inner sleeve 28 of the end cover 1. These support arms are structurally rigid within the end cover, and they are provided for securing by fastener means 33 the silicon controlled rectifier components 34 of the rectifying unit. It should be noted that the support arms are disposed perpendicularly to each other, and are so arranged in relationship to the inner sleeve 28 so as to provide spaced openings, as at 35, so as to allow for the reasonably unobstructed passage of cooling air thereby as it traverses into the interior portion of the electrical motor. The silicon controlled rectifiers 34 are electrically attached by means of an input conductor 36 to the electronic components affixed to the circuit board, said rectifiers being further electrically connected by means of an output conductor 37, integral with conductor 25, to the brushes of the motor assembly. An insulating conduit 38 furnishes protection to the electrical conductors 37 and 25 which convey the necessary direct current to the operative, power torque producing portions of the electrical motor.

The outer shield 7 totally covers the external opening of the enclosure 6, thereby protecting the proximate electronic components of the rectifying unit from open exposure, and also provides means for allowing passage of air therethrough for producing a cooling action. Likewise, the inner shield 29 completely encloses the internal opening of enclosure 6 protecting the electronic components from contacting any of the moving elements of the electrical motor. Inner shield 29 also contains a series of parallel vents 39 which allows for the passage of air therethrough into the electrical motor.

When the electrical motor of this invention is sustained in operation, as when it is "turned on" and energized, common alternating current will be supplied to the rectifying unit whereby through the cooperative action of the various electronic components and silicon controlled rectifiers the electric charge will be converted into a direct current prior to its conveyance to the commutator of the electrical motor. As the electrical motor accelerates and builds up a power torque for sustaining the motor operative, the fan 19 will simultaneously revolve with the motor shaft 17, and thereby provides a means for attracting external air through both the vent openings 2 of the end cover, and also through the enclosure 6 disposed centrally of said end cover 1. As has previously been discussed, rectifiers of the silicon controlled type are rather compact in size and have a tendency to elevate in temperature, during sustained usage, and unless they are properly conditioned by a cooling medium, they are subject to deteriorate and become inefficient in performance. Also, electronic components of the rectifying unit are equally prone to deteriorate when exposed for an extended length of time to elevated temperatures. By placing the unit centrally within the end cover of the motor assembly, within the currents of air attracted by the operation of the fan the cooling air will be drawn in from the atmosphere in proximity to the motor for circulating through the various components of the rectifying unit and stabilize their temperatures to a lesser degree. Furthermore, by properly disposing the various silicon controlled rectifiers 32 of this invention in direct alignment with the vent openings 13 as provided in the circuit board 11, a maximum efficiency of air conditioning is achieved for maintaining said components at a more cooled temperature. Furthermore, by securely fastening the silicon controlled rectifiers of the rectifying unit to the support arms that are integral with the end cover 1, additional means for heat dissipation is provided since the heat created internally within the rectifiers may be conveyed by conduction into the end cover and its associated radial fins 3 for release into the surrounding air.

Various methods have been devised for attempting to provide a way for dispelling the heat created within the rectifier unit of an electrical motor, but most such units are poorly organized, having the electronic components inserted, normally inaccessibly, wherever space can be found within the motor. Also, such units are subject to deteriorate unless they are properly affixed and stabilized within the motor structure, free from any of the motor vibrations. Both the electronic components of this invention as affixed to the circuit board 11, and the silicon controlled rectifiers as secured to the support arms, are firmly mounted to structurally solid parts of the electrical motor, alleviating the rectifying unit's exposure to undesirable and detrimental movement. These components and rectifiers are rigidly fastened, not loosely mounted, stationary to the solid structure of the motor. Also, by including the electronic components upon a circuit board which is positioned proximate to one end of the motor assembly, merely being covered from view by an outer shield, one need simply to remove only the outer shield for exposing all the electronic components of the unit so that they may be made readily exposed for convenient and rapid replacement upon their deterioration and malfunctioning within the rectifying circuit.

By incorporating into a direct current motor the rectifier unit of this invention in the novel arrangement as disclosed within the end cover of said motor, the entire unit is retained hidden from view totally within the motor structure, and is conveniently ventilated with a pr_ tionate share of the cooled air absorbed into the n by means of its fan. It should be recognized that th( cover and inherent enclosure of this invention ma disposed at either end of the electrical motor, e proximate or remote from the motor fan, with eithe motor fan's drawn air being absorbed through the e sure into the interior of the motor, or being forcec of the motor through the enclosure after being absc therein at the end opposite the location of the recti: unit.

It is to be understood that the above described d( and arrangements of the various parts of the inventio_ merely illustrative of the application of the principl_ the invention. Numerous other arrangements ma_ readily devised by those skilled in the art which embody the principles of the invention and fall withi_ spirit and scope thereof.

Having thus described the invention, what is cla_ and desired to be secured by Letters Patent is:

1. An electrical motor assembly for a direct cu: motor energized by rectified alternating current com ing, an end cover secured to one end of the elect motor, an outwardly opening enclosure integral with end cover, means for mounting the rectifying unit o: electrical motor to said end cover within said enclo: and ventilating means provided in the motor assembl_ attracting air for cooling the enclosure and rectifying 2. An electrical motor assembly for a direct cu_ motor energized by rectified alternating current as closed in claim 1 and further characterized by said closure comprising an inner sleeve integral with said cover, outer and inner vented shields providing clo: for the enclosure, and said enclosure being disposed _ imately centrally of the end cover.

3. An electrical motor assembly for a direct cu: motor energized by rectified alternating current as closed in claim 2 and further characterized by said closure being disposed proximately adjacent to the tilating means of the electrical motor.

4. An electrical motor assembly for a direct cu motor energized by rectified alternating current as closed in claim 2 and further characterized by a ci board fastened to said inner sleeve for containing the tronic components of the rectifying unit and disp within the enclosure, said circuit board being positi_ within the air currents attracted by the ventilating m of the electrical motor, and said circuit board havi plurality of vent openings provided therethrough fo lowing passage of said ventilating air.

5. An electrical motor assembly for a direct cu motor energized by rectified alternating current as closed in claim 4 and further characterized by sup arms being integrally connected to the inner sleeve disposed in parallel relationship with said circuit b within the enclosure, said support arms provided fo tention of the rectifiers of the rectifying unit.

6. An electrical motor assembly for a direct cu motor energized by rectified alternating current as closed in claim 5 and further characterized by the sup arms being arranged perpendicularly to each other being substantially aligned adjacently to the vent c ings of the circuit board.

7. An electrical motor assembly for a direct cu motor energized by rectified alternating current as closed in claim 6 and further characterized by said i sleeve and integral support arms being so arranged _ to provide spaced openings therebetween for allowing sage of the ventilating air.

8. An electrical motor assembly for a direct cu motor energized by rectified alternating current con ing an end cover secured to one end of the elec_ motor, an enclosure for retaining the rectifying un the electrical motor provided in said end cover, sai_ closure formed by an inner sleeve integral with said cover and outer and inner vented shields providing closure for the enclosure, said enclosure being disposed centrally of the end cover, a circuit board having a plurality of vent openings connected to said inner sleeve and disposed within said enclosure, support arms arranged perpendicularly to each other integrally connected to the inner sleeve and disposed in parallel relationship with said circuit board within the enclosure, and ventilating means provided in the motor assembly for attracting air for cooling the enclosure and rectifying unit.

References Cited

UNITED STATES PATENTS

| | | | |
|---|---|---|---|
| 3,225,232 | 12/1965 | Turley | 310—50 |
| 3,194,994 | 7/1965 | Latta | 310—68 |
| 3,170,079 | 2/1965 | Jaeschke | 310—68 |
| 3,299,303 | 1/1967 | Newill | 310—66 |

MILTON O. HIRSHFIELD, *Primary Examiner.*

J. MILLER, *Assistant Examiner.*